United States Patent [19]

Bushon

[11] Patent Number: 5,346,232
[45] Date of Patent: Sep. 13, 1994

[54] WHEELBARROW POWER STRAP

[76] Inventor: Richard J. Bushon, 1335 S. Cortez Rd., Apache Junction, Ariz. 85219

[21] Appl. No.: 44,015

[22] Filed: Apr. 8, 1993

[51] Int. Cl.5 ............................................... B62B 1/22
[52] U.S. Cl. ............................. 280/47.31; 280/47.32; 294/15; 298/3
[58] Field of Search ............. 280/47.31, 47.315, 47.32, 280/47.33, 47.371, 659, 653; 298/2, 3, 17 R; 294/15

[56] References Cited

U.S. PATENT DOCUMENTS

| 1,525,383 | 2/1925 | Haarberg | 294/15 |
| 1,625,758 | 2/1927 | Dialoc Coop. | 280/47.31 |
| 4,824,127 | 4/1989 | Stamm | 280/47.32 X |
| 4,962,833 | 10/1990 | McCurdy | 280/47.31 X |

FOREIGN PATENT DOCUMENTS

| 592920 | 2/1960 | Canada | 280/47.31 |
| 77248 | 1/1949 | Czechoslovakia | 280/47.31 |
| 356992 | 10/1961 | Switzerland | 280/47.33 |
| 1191347 | 11/1985 | U.S.S.R. | 280/47.31 |
| 188674 | 4/1923 | United Kingdom | 280/47.31 |
| 430574 | 6/1935 | United Kingdom | 294/15 |

Primary Examiner—Brian L. Johnson

[57] ABSTRACT

A cross member is mounted to and extends between the handleshafts of a wheelbarrow at a location intermediate the material carrying bin of the wheelbarrow and the handles which are grasped by the laborer whereby the laborer grasping the handles can place the front of his thigh against the cross member to exert a force on the wheelbarrow to initiate lifting and forward movement of the wheelbarrow using his thigh muscles to reduce any strain on the arms, shoulders and/or back of the laborer. The cross member is a flexible strap which has mounting assemblies that is adjustable in length to permit the cross member to be mounted on wheelbarrows having differing spacings between the handleshafts.

2 Claims, 1 Drawing Sheet

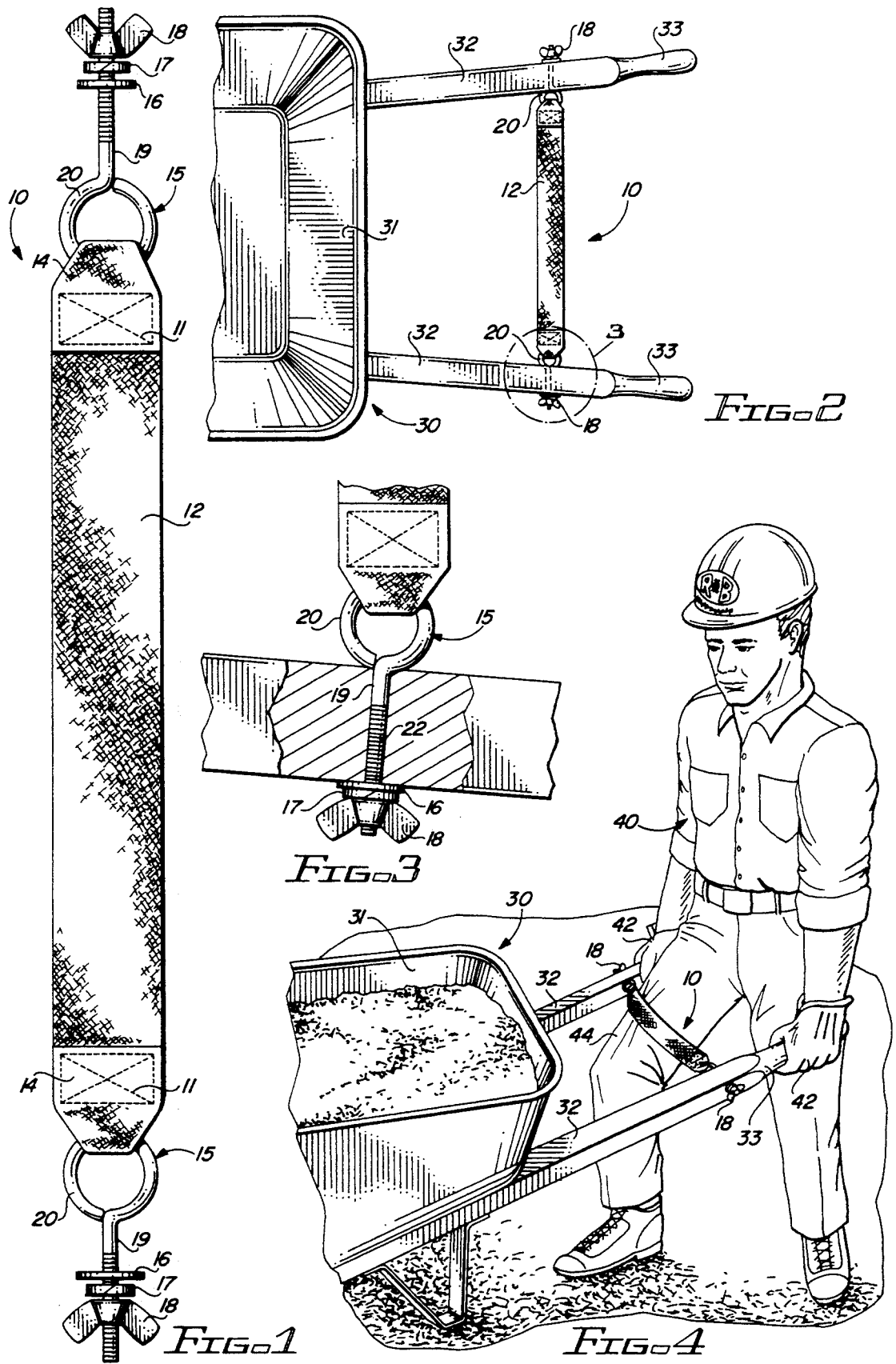

WHEELBARROW POWER STRAP

BACKGROUND OF THE INVENTION

The present invention relates to an accessory for a wheelbarrow and more specifically to a cross member mounted between the handleshafts of the wheelbarrow which a laborer pushes against with his thigh to initiate lifting and forward movement of the wheelbarrow and reduce or eliminate the strain which would otherwise be placed on the laborer's arms, shoulders and/or back by the lifting and moving the wheelbarrow.

Wheelbarrows are used in commercial landscaping; in building, highway and other construction and repair work, in manufacturing and other industrial applications and by the home handyman to convey dirt, gravel, concrete and other heavy materials. Frequently, when using a wheelbarrow, the laborer strains his back, arms and/or shoulders when lifting and initiating the forward movement of the wheelbarrow or when encountering an obstruction such as a ramp, rut, curb, piece of wood, etc. in the path of the wheelbarrow. The strains placed on the arms, shoulders and back of the laborers are not only injurious to the health and well being of the laborers, they cause laborer downtime, disruption on the work site and increasingly costly medical expenses. Thus, there has been a need to provide a means to greatly reduce the arm, shoulder and back strain associated with the use of wheelbarrows for the well being of the laborers, to increase productivity, to reduce operating costs and to reduce laborer downtime and medical expenses.

SUMMARY OF THE INVENTION

The present invention solves these long felt needs through an inexpensive and highly effective wheelbarrow accessory which greatly reduces the strain placed on the laborer's arms, shoulders and back. The accessory is a cross member or power strap which extends between and is secured to the handleshafts of the wheelbarrow between the material carrying bin and the handles of the wheelbarrow. The cross member or power strap, in its preferred form, comprises a flexible strap made of seat belt strapping with eyebolts mounted on each end of the strap for securing the cross member or power strap to the handleshafts of the wheelbarrow.

When the laborer desires to lift the handleshafts of the wheelbarrow and initiate forward movement of the wheelbarrow or encounters an obstruction with the wheelbarrow, he places his thigh against the power strap and uses his thigh muscles to help lift and move the wheelbarrow forward. This relieves the stress and strain which would otherwise be placed on the arms, shoulders and back of the laborer.

In addition to greatly reducing injuries and arm, shoulder and back strain associated with the use of wheelbarrows, the cross member or power strap of the present invention greatly reduces the fatigue that normally results from the use of a wheelbarrow. The use of the cross member or power strap of the present invention has also been found to increase the productivity of the laborer by about 20% to 30%.

BRIEF DESCRIPTION OF THE DRAWINGS

FIG. 1 is plan view of the cross member or power strap of the present invention.

FIG. 2 is a partial plan view of a wheelbarrow with the power strap of the present invention mounted on the handleshafts of the wheelbarrow.

FIG. 3 is a detail of the mounting assembly of the power strap of the present invention enlarging the circled portion 3 of FIG. 2.

FIG. 4 is a partial perspective view of a wheelbarrow equipped with the power strap of the present invention showing the power strap in use.

DETAILED DESCRIPTION OF THE PREFERRED EMBODIMENT

The cross member or power strap 10 of the present invention is shown in FIG. 1. The power strap 10 comprises a strap 12 and a pair of eyebolts 15. The strap 12 is made from seat belt strapping and is provided with loops 14 at each end that are formed by folded over end portions of the strap that are secured to the strap by stitching 11. Each eyebolt 15 comprises an eye portion 20, a threaded shaft 19, a washer 16, a lock washer 17, and a wing nut 18. The loops 14 of the strap 12 pass through the eyes 20 of the eyebolts 15 to secure the eyebolts to the strap 12.

FIGS. 2 and 3 show the power strap 10 mounted on the handleshafts 32 of a wheelbarrow 30. While only partially shown, the wheelbarrow 30 is a conventional wheelbarrow with a wheel rotatably mounted to and located between the handleshafts adjacent the ends of the handleshafts which extend beyond the front of the material carrying bin 31. The material carrying bin 31 is supported by and bolted to the handleshafts 32 in a conventional manner. A pair of struts are mounted on the undersides of the handleshafts, beneath the material carrying bin 31, to support the wheelbarrow when it is at rest.

As best shown in FIG. 2, the power strap 10 extends between and substantially perpendicular to the handleshafts 32. The power strap is mounted on the handleshafts intermediate the handles 33 of the handleshafts and the material carrying bin 31. While the exact location of the power strap 10 can vary, provided it is positioned so that the laborer 40 can press his thigh 44 against the strap 12 while grasping the handles 33, the power strap is preferably located between six and twelve inches from the ends of the handleshafts shown in FIG. 2.

The power strap 10 is secured to the handleshafts 32 by passing the shafts 19 of the eyebolts 15 through holes drilled in the handleshafts as shown in FIG. 3. A washer 16 and lock washer 17 are then placed on each shaft 19 and a wing nut is threaded onto the shaft 19 to fasten the power strap to the handleshafts 32.

While not shown in FIG. 3, the shaft 19 of the eyebolt 15 can be longer in length to permit the overall length of the power strap 10 to be adjusted to fit different wheelbarrows having different spacings between the handleshafts 32. The adjustment is made by tightening the wing nut 18 until it is firmly abutted against the lock washer 17, leaving the end of the shaft 19 to protrude beyond the wing nut. With this means of adjustment, the power strap 10 can be easily installed on different wheelbarrows.

With the eyebolt mounting and the flexibility of the strap 12, the power strap 10 can twist and/or rotate to orient itself when in use to lie flat against the front of the laborer's thigh as shown in FIG. 4. This spreads the pressure over a greater area of the laborer's thigh and makes the power strap comfortable to use.

FIG. 4 shows the power strap 10 in use on a wheelbarrow 30. When the laborer 40 is ready to move the wheelbarrow, he grasps the handles 33 with his hands 42 as shown in FIG. 4 and places the front of one of his thighs 44 against the power strap 10. The power strap 10 twists or rotates to lie flat against his thigh. The laborer then exerts pressure with his strong thigh muscles to initiate the lifting and forward movement of the wheelbarrow 30. Of course the power strap 10 can be used any time the laborer encounters an obstruction such as a ramp, curb, rut, mud, etc. to move the wheelbarrow forward or to dump the wheelbarrow without straining his arms, shoulders or back.

While a strap such as strap 12 is preferred, it is contemplated that a cable or a rigid member could be used in place of the strap 12. In addition, while the preferred embodiment uses eyebolts 15 to mount the power strap 10 on the handleshafts 32, it is contemplated that clamps or other fastening means can be used to mount the power strap on the handleshafts 32.

What is claimed is:

1. In a wheelbarrow comprising a frame having a pair of handleshafts, a wheel rotatably mounted between and to the handleshafts adjacent a first end of each of the handleshafts for supporting the wheelbarrow and allowing the wheelbarrow to be moved, each of the handleshafts having a handle adjacent a second end of the handleshaft, a material carrying bin mounted on and supported by the pair of handleshafts intermediate the ends of the handleshafts, the second ends of the handleshafts extending beyond the material carrying bin and being spaced apart from each other to enable a laborer to grasp the handles to lift one end of the wheelbarrow and move the wheelbarrow, the improvement comprising:

a flexible cross member of seat belt strapping extending between and secured to the handleshafts at a location between the handles and the material carrying bin whereby a laborer grasping the handles can place the front of his thigh against the cross member to exert a force on the wheelbarrow to initiate lifting and forward movement of the wheelbarrow using his thigh muscles to reduce any strain on the arms, shoulders and/or back of the laborer;

said cross member being secured to the handleshafts by eyebolts having looped heads secured to ends of said cross member whereby said cross member can twist to have a flat surface of the strapping pass over the thigh of the laborer for comfort and the length of the cross member can be adjusted to fit the spacing between the handleshafts.

2. The improvement of claim 1 wherein: the cross member is secured to the handleshafts a distance of 6 to 12 inches from the second ends of the handleshafts.

* * * * *